US006967927B1

(12) United States Patent
Dugeon et al.

(10) Patent No.: US 6,967,927 B1
(45) Date of Patent: Nov. 22, 2005

(54) METHOD OF TRANSMITTING DATA FLOWS OVER AN ATM NETWORK AND DEVICE FOR IMPLEMENTING THE METHOD

(75) Inventors: Olivier Dugeon, Pleumeur Bodou (FR); Fabrice Guillemin, Pleumeur Bodou (FR); Christophe Mangin, Breal sous Monfort (FR)

(73) Assignee: France Telecom, Paris (FR)

( * ) Notice: Subject to any disclaimer, the term of this patent is extended or adjusted under 35 U.S.C. 154(b) by 1037 days.

(21) Appl. No.: 09/717,735

(22) Filed: Nov. 21, 2000

(30) Foreign Application Priority Data

Nov. 23, 1999 (FR) .................................. 99 14722

(51) Int. Cl.[7] .............................. H04J 1/16; H04J 3/16; H04L 12/28
(52) U.S. Cl. ................... 370/236.1; 370/397; 370/419; 370/465
(58) Field of Search .............................. 370/465, 468, 370/395.43, 395.1, 395.5, 232, 397, 236.1, 370/419, 399, 395.21, 395.2

(56) References Cited

U.S. PATENT DOCUMENTS

| | | | | |
|---|---|---|---|---|
| 5,543,951 A | * | 8/1996 | Moehrmann | 370/395.5 |
| 5,546,386 A | * | 8/1996 | Gass | 370/395.4 |
| 6,104,714 A | * | 8/2000 | Baudelot et al. | 370/396 |
| 6,167,049 A | * | 12/2000 | Pei et al. | 370/395.43 |
| 6,295,532 B1 | * | 9/2001 | Hawkinson | 707/4 |
| 6,307,866 B1 | * | 10/2001 | Hayter | 370/468 |
| 6,359,863 B1 | * | 3/2002 | Varma et al. | 370/232 |
| 6,628,946 B1 | * | 9/2003 | Wiberg et al. | 370/331 |

FOREIGN PATENT DOCUMENTS

EP          0 836 352          4/1998

OTHER PUBLICATIONS

J Boyer, et al. "Accelerated Signalling for the Internet Over ATM (Asia)", European Transactions on Telecommunications, Mar.-Apr. 1999, vol. 10, No. 2, pp. 153-164.

* cited by examiner

Primary Examiner—Andy Lee
(74) Attorney, Agent, or Firm—Gardner Carton & Douglas LLP

(57) ABSTRACT

Data flows generated in accordance with a connected mode protocol and formatted in packets in accordance with a non-connected mode protocol are transmitted via an ATM network. A set of virtual circuits of the ATM network is assigned in advance to each pair of access points of the ATM network, without allocating transmission rate resources to them. When an access point receives a request, formulated in accordance with the connected mode protocol, to establish a connection between a source address and a destination address accessible via another access point of the ATM network, an available virtual circuit is selected from the set assigned to this pair of access points and a resource management cell containing a request to activate the virtual circuit is transmitted on the selected virtual circuit. When this cell is received by a node of the ATM network located on the selected virtual circuit, a transmission rate resource is allocated, if it is available, to the selected virtual circuit.

16 Claims, 6 Drawing Sheets

METHOD OF TRANSMITTING DATA FLOWS OVER AN ATM NETWORK AND DEVICE FOR IMPLEMENTING THE METHOD

BACKGROUND OF THE INVENTION

The present invention relates to the transmission over ATM (<<Asynchronous Transfer Mode >>) networks, of data flows generated in accordance with a connected mode transport protocol and formatted into packets using a non-connected mode network protocol. In one specific application, the TCP transfer protocol (<<Transmission Control Protocol>>) and the IP network protocol (<<Internet Protocol>>) are considered.

Recent years have seen an explosion in commercial use of the Internet, both amongst the general public who have access to the Internet from home computers and from professional telecommunications services. In addition, more and more applications are appearing on the Internet networks which have stringent requirements in terms of transfer rate and quality of service (QoS).

Originally designed without any concern for quality of service and mainly geared towards data transmission, the Internet network protocols and IP in particular are based on simple and robust principles for routing packets but at the expense of operations that are costly in terms of time and software processing capacity, which can give rise to bottlenecks. As a result, the network service offered by the Internet is what is referred to as <<best effort>>, i.e. the network transfers information to the best of its ability and without any guarantee either as regards loss of information or delays in transfer. The task of restoring the integrity of transmitted data then falls to the protocols and applications embedded in the users' equipment.

Of these protocols, TCP is currently the most common because it is the transfer protocol used for exchanges linked to electronic mail (SMTP, <<Simple Mail Transfer Protocol>>), file transfers (FTP, <<File Transfer Protocol>>), Web (HTTP, <<HyperText Transfer Protocol>>), etc. In spite of the security which it affords through retransmission and flow control mechanisms, TCP does not guarantee the quality of service afforded to applications in terms of available speed and transfer time, these parameters remaining very much dependent on the status of the network at the level of the IP layer. This situation is due to the fact that the mechanisms used by TCP are only available in the terminals and do not make use of any explicit information about the resources available within the network. More specifically, the flow and congestion controls of TCP regard the network as a black box and react when the loss of packets is detected at the terminals, which leads to a significant degradation in the performance of the applications. For example, when transferring fixed images forming part of a Web page, this degradation disrupts usage (jerky displays, waiting, unrecoverable lock-up, . . . ) reflecting the level of quality of service provided by the network in a very tangible manner.

Several solutions are under study as a means of improving both speeds and quality of service accessible to Internet traffic and TCP in particular. Basically, there are two general lines of thinking as to how transmission rates can be increased:

<<all IP>> networks, which are extensions of the existing IP networks, with routers having the capacity to relay packets at high speed (giga-routers), interconnected by very high speed transmission arteries, of the SDH (<<Synchronous Digital Hierarchy>>) or WDM (<<Wavelength Division Multiplexing>>) type. Several techniques may be used to set up such routers, for example by a parallel arrangement of the packet forwarding engine within the routers or using a label switching system (the <<MultiProtocol Label Switching>> solution, or MLPS from the IETF) in order to short-circuit the process of analysing addresses packet by packet;

IP networks using the ATM technique as a switching core. The ATM network may be used directly to transfer IP traffic or, alternatively, by introducing coupling between ATM and IP to restore the concept of connection (to a more or less strict degree) in IP, for example by using the MPLS technique (<<MultiProtocol Label Switching>>) applied to the ATM.

There are also two approaches to quality of service. The first is to improve quality of service differently from one service to another, without necessarily being able to give the user any contractual guarantee in terms of objectives. This principle is being studied by the DiffServ group of the IETF. The second approach, by contrast, is to guarantee quality of service objectives.

Several techniques have been introduced as a means of transporting TCP traffic on an ATM network:

1) Transporting Internet traffic via an ATM network having MPLS functions. ATM connections (virtual circuits or paths) are created by the MPLS functions. At the network access point, the TCP segments (encapsulated in IP packets) are directed by the MPLS edge router to one or other of the established ATM connections depending on the destination IP address. Several TCP connections may be grouped on a same virtual circuit (<<VC>>). Furthermore, several virtual circuits at the input of a network element can be merged to a same output circuit (<(VC merging >>). The major problem of MPLS in its current version is that it lacks the tools to manage traffic. The flows manipulated by MPLS are of the UBR type (<<Unspecified Bit Rate>>) and are therefore lacking in quality of service. Attempts are currently being made to combine the MPLS and DiffServ approaches. This can be easily resolved by introducing priority mechanisms between flows at the output ports of the switches/routers. Commercially available products such as <<(PacketStar>> sold by the company Lucent are already offering an approach of this type.

2) Transporting TCP traffic via generic ATM transfer capacities, namely:
   SBR: <<Statistical Bit Rate>>), also referred to as <<Variable Bit Rate >> (VBR) at the ATM Forum;
   ABR: <<Available Bit Rate>>;
   UBR: <<Unspecified Bit Rate>>, optionally with mechanisms to discard packets selectively (EPD, <<Early Packet Discard>>, or PPD, <<Partial Packet Discard>>);
   GFR: Guaranteed Frame Rate >>.

Statistical traffic parameters (e.g. sustainable speed and maximum burst size in the case of SBR capability) are determined a priori. In order to transport TCP traffic, a statistical ATM connection is established which must comply with the prescribed traffic contract. Solutions falling within this family are inadequate because generic ATM transfer capabilities require fixed traffic parameters (speed and associated cell volume) whereas the TCP control mechanism is based only on the volumes of information transferred and does not take account of speed as a parameter. Furthermore, the volume of information transmitted by TCP depends on traffic conditions within the network and hence a large number of parameters which are uncontrollable as a whole and which fluctuate over time. It is therefore difficult to determine statistical traffic parameters to qualify the TCP flows. If the parameters chosen are inaccurate, this can lead to losses in the font mechanisms at the network input, thereby causing a significant deterioration in the transfer quality of the TCP flows.

3) TCP regulation by speed control (ACK bucket, control of window size). Observations (estimation of transfer time) are made in order to deduce the state of congestion on the network and adapt the dynamics of TCP by regulating the transmission of the acknowledgement segments to avoid losing information in the network and to set a speed value for TCP. This technique is applicable even if the transport network is not of the ATM type. This TCP adjustment by controlling speed is based on adaptive and empirical flow control methods. They are applied at the periphery of the network which nevertheless remains basically of the <<best effort >> type. In particular, resources are not reserved in the different nodes of the network and it is therefore not possible for the network to provide any contractual guarantee with regard to quality of service objectives.

4) Coupling TCP with broadband signalling. Whenever a TCP connection has to be made, an Internet signalling message (for example RSVP) is issued by the source terminal and a conventional broadband signalling procedure (complying with the Q.2931, Q.2963 protocols, etc. of the UIT-T) is initiated by the router at the network input in order to establish an ATM connection corresponding to the TCP connection. Unfortunately, the response times in broadband signalling are too long for TCP transport because of the processing which has to be applied by the software to the signalling messages (which vary in size and contain too much non-relevant information in the case of TCP streams) in the signalling controllers and of various security protocols used when exchanging signalling messages (SSCOP). It has now been more or less admitted that broadband signalling is not suitable for transactions taking place on the Internet.

5) Proposals for lightweight signalling. On the grounds that the procedure of coupling TCP and broadband signalling described above is too laborious and too slow, proposals have recently appeared in various publications as to how the signalling procedures can be simplified, and in particular what are known as the UNITE systems (see G. Hjámtýsson et al., <<UNITE—An Architecture for Lightweight Signaling in ATM Networks>>, Proc. Infocom'98, New York, April 1998), OPENET, (see I. Cidon et al. <<OPENET: An Open and Efficient Control Platform for ATM Networks >>, Proc. Infocom'98, New York, April 1998) and Dynaflow (see Q. Bian et al., <<Dynamic Flow Switching—A New Communication Service for ATM Networks>>, Proc. Infocom'98, New York, April 1998).

In UNITE, proposed by the company AT&T, detection of a stream prompts a mono-cell signalling procedure initialised in the network in order to set up an ATM VC. The establishment is made hop by hop and includes setting up the connection and allocating resources.

In OPENET, proposed by the company Sun Microsystems, conventional broadband signalling is used between the user and the network. Within the network, the routes are established by P—NNI and the route activation is performed by means of a mono-cell signalling scheme.

In DYNAFLOW, proposed by the George Washington University, the IP packets segmented into ATM cells are regrouped in the form of datagrams with a specific header for resources management, the purpose of which is to switch the datagram into the network and reserve the resources for the datagram.

6) Open loop multiplexing and congestion control using techniques to selectively discard TCP Packets (PPD, EPD, WRED, etc.) and mechanisms to assign Priority between traffic classes. Given that TCP reacts to loss by reducing the volume of information transmitted, the simplest way of transporting TCP flows is to allow them into the network without any control of statistical parameters and to multiplex them in open loop. Some packets will then be entirely (EPD) or partially (PPD) discarded if the buffer memories in the network become full. This approach can be refined by introducing priority mechanisms between flows: certain flows can be delivered to the output ports of the network elements more rapidly than others (<<Expedited Forwarding >>); or a larger memory space might be reserved for certain flows to guarantee that less information is lost (<<Assured Forwarding>>). These open loop statistical multiplexing schemes which use priority mechanisms and techniques to discard TCP packets selectively are not capable of guaranteeing quality of service objectives. They may be used to selectively improve the transfer quality of one class of service as opposed to another but are in no way capable of guaranteeing objectives.

It has been shown that a mechanism for spacing ATM cells could be used to regulate the dynamics of TCP on an ATM network (see F. Guillemin et al., <<Regulation of TCP over ATM via Cell Spacing>>, Proc. ITC'16, Edinburgh, June 1999). A spacing mechanism of this type may also prevent buffer memories of the network from overflowing in the case of the non-connected mode UDP protocol (<<User Datagram Protocol>>). On this basis, a lightweight signalling protocol has been developed, known as ASIA, which associates each transfer of Internet information, via TP or UDP, with an ATM virtual circuit of the ABT type (<<ATM Block Transfer>>), including the establishment and definition of resources within the network by exchanging monocell messages made up of resource management (RM) cells (see J. Boyer et al., <<Accelerated Signaling for the Internet over ATM (ASIA)>>, European Transactions on Telecommunications, 1999, Special issue on architectures, protocols and quality of service for the Internet of the future).

An object of the invention is to guarantee objectives (in terms of information loss, minimal usable bandwidth and/or transfer time) in transfer quality of the traffic of a connection of a transport protocol such as TCP/IP carried by an ATM connection.

SUMMARY OF THE INVENTION

Accordingly, a method is proposed for transmitting, over an ATM network, data flows generated in accordance with a connected mode transport protocol and formatted in packets in accordance with a non-connected mode network protocol, each packet containing a source address and a destination address. The method of the invention comprises the steps of:
assigning, in advance, a set of virtual circuits of the ATM network to each pair of access points of the ATM network without allocating transmission rate resources to said virtual circuits;
when a first access point of the ATM network receives a request, formulated in accordance with said connected mode protocol, to establish a connection between a source address and a destination address accessible via a second access point of the ATM network, selecting an available virtual circuit from the set assigned to the pair comprising said first and second access points of the ATM network and transmitting on the selected virtual circuit an ATM resource management cell containing a message requesting activation of the selected virtual circuit;

when said ATM resource management cell is received by a node of the ATM network located on the selected virtual circuit, assigning a transmission rate resource, if available, to the selected virtual circuit.

The aforesaid source and destination <<addresses>> are within the meaning of said connected mode transport protocol. In a typical, but not restrictive, situation where this connected mode protocol is TCP/IP, these <<addresses >> consist of pairs <IP address, TCP port>.

Each TCP connection is associated with an ATM virtual circuit (VC) for which resources (bandwidth and memory space) are reserved within the network by means of a simplified signalling procedure. Since a set of sleeping ATM virtual circuits was created (i.e. with a zero transmission rate), typically by the MPLS functions, the establishment of a TCP connection (detection of the SYN segment) is synchronised with a mono-cell procedure to allocate resources on these virtual circuits. The same will apply equally at the time when the TCP connection is terminated (when the FIN segment is detected).

Since resources are allocated to a TCP stream within the ATM network, quality of service objectives (transfer time, usable bandwidth and information loss rates) can be guaranteed and can be so in a way which is transparent to TCP via synchronisation of the two connection establishment procedures.

The transmission resources may be assigned to two separate ATM virtual circuits for the two opposite communication directions between the first and second access points. These virtual circuits could also be merged (two-way ATM connection).

The stream of ATM cells corresponding to a TCP connection is spaced by a cell spacing technique, for example of the type described in EP-A-0 438 009, FR-A-2 668 324 or EP-A-0 552 121. This provides a simple means of associating a transmission rate with a TCP connection carried by an ATM connection, a concept which is totally lacking in the TCP layer, which can only manipulate a volume of information.

It should be pointed out that the TCP connections for which the method enables quality of service objectives to be attained do not necessarily represent all TCP connections operated within the network: some might settle for <<best effort>> mode with limited, non-guaranteed transmission rates, which might even assume very low values.

The activation request message preferably contains an indication of the rate resource required for the connection unless this can be initially defined by default. In particular, the transmission rate resource indicated in the activation request message may represent a reference transmission rate on the connection. ATM resource management cells containing messages for adjusting the flow control relative to the reference transmission rate are then transmitted on the virtual circuit selected by the first access point of the ATM network and acknowledged on the virtual circuit selected by the second access point of the ATM network. These flow control messages may be generated depending on how full the spacing buffer of the access point for the relevant connection is.

In one embodiment of the method, transmission of the ATM resource management cell containing the activation request message is immediately followed by transmission on the selected virtual circuit of at least one ATM cell carrying said connection establishment request. This will avoid having to include connected mode protocol address data in the resource management cell. Each ATM cell message following the activation request message on the selected virtual circuit and carrying said connection establishment request is discarded by a node of the ATM network located on the selected virtual circuit if the rate resource to be assigned to the selected virtual circuit is not available. The access point originating the activation request advantageously performs the following operations:

starting a timer when transmitting the ATM resource management cell containing the activation request message;

if no acknowledgement of said connection establishment request carried by at least one ATM cell following the activation request message on the selected virtual circuit is received from the second access point of the ATM network before the timer expires, transmitting on the selected virtual circuit an ATM resource management cell containing a request to deactivate the selected virtual circuit.

The timer duration preferably corresponds to that of a retransmission time stipulated by the connected mode transport protocol (75 s in the case of TCP/IP).

If a repetition of the connection activation request is received by the first access point from the source address before it has received an acknowledgement from the second access point of the network, it re-transmits on the selected virtual circuit at least one ATM cell carrying said connection establishment request. When the re-transmitted ATM cell is received by a node of the ATM network which has discarded the ATM cell following the activation request message on the selected virtual circuit and carrying said connection establishment request, a transmission resource can again be allocated, if available, to the selected virtual circuit.

Another aspect of the present invention relates to an interface device for a first access point located at a user-network interface of an ATM network, for transmitting over said ATM network data flows generated in accordance with a connected mode transport protocol and formatted in packets in accordance with a non-connected mode network protocol, each packet containing a source address and a destination address. This device comprises:

means for assigning, in advance, a set of virtual circuits of the ATM network to at least one pair consisting of said first access point of the ATM network and a second access point of the ATM network, without allocating transmission rate resources to said virtual circuits;

means for selecting an available virtual circuit from the set assigned to the pair comprising said first and second access points of the ATM network in response to receipt of a request, formulated in accordance with said connected mode protocol, to establish a connection between a source address and a destination address accessible via the second access point;

means for transmitting on the selected virtual circuit an ATM resource management cell containing a message requesting activation of the selected virtual circuit and for allocating transmission rate resources to the selected virtual circuit.

DESCRIPTION OF PREFERRED EMBODIMENTS

Initiating and terminating TCP connections

A TCP connection is established between a port of a source station and a port of a destination station. Each of the two stations has an IP address. Each port assigned to an application run on a station has a port number which is valid for this station. The TCP connection is therefore mainly characterised by a quartet comprising <source IP address, source port number, destination IP address, destination port number >.

Figure 1:
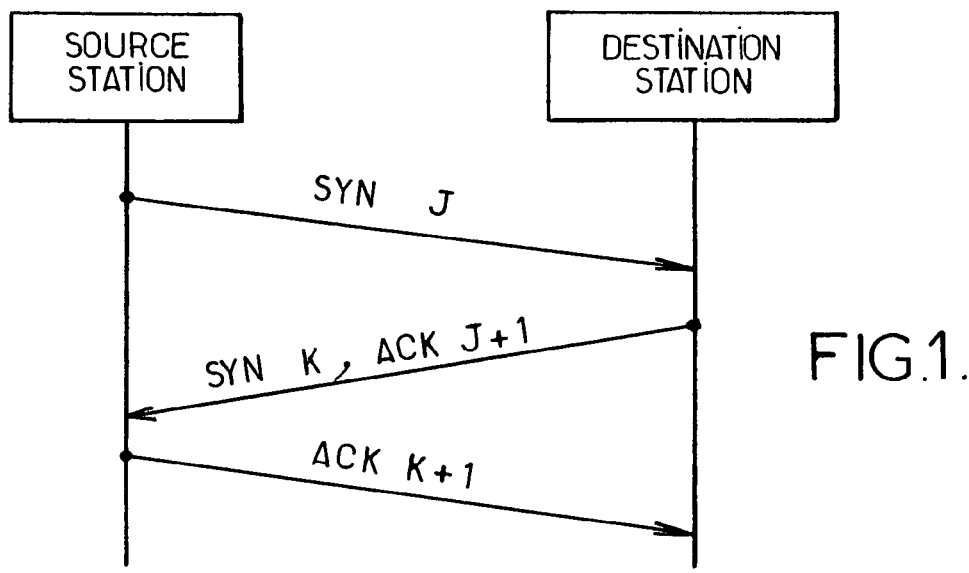
FIGS. 1 and 2 are diagrams illustrating respectively the initiation and termination of a TCP connection between two stations.

As stipulated in the RFC 793 issued by the IETF (<<Internet Engineering Task Force>>), a TCP connection between two stations is initiated by an exchange of messages (or segments) between the source and destination ports, as illustrated in FIG. 1. The first message SYN J (where J is a sequence number) is a TCP connection establishment request. It incorporates the numbers of the source port (Ps) and destination port (Pd) and is encapsulated in an IP datagram containing the IP addresses of the source (@IPs) and destination (@IPd) stations. Establishment of the connection in the source→destination direction is acknowledged by the second message (ACK J+1) which simultaneously carries the establishment request in the destination→source direction (SYN K). In this message, the numbers Ps and Pd are exchanged, as are the addresses @IPs and @IPd in the IP datagram carrying them. Finally, the connection opened in the destination→source direction is acknowledged by the third message (ACK K+1). For each establishment (first and third messages), the TCP protocol starts a timing mechanism. If the ACK segment has not arrived by the end of the timed period, it returns a SYN segment: after 6 s, and then 24 s. A maximum of three connection attempts are permitted for an overall time of 75 s.

Figure 2:
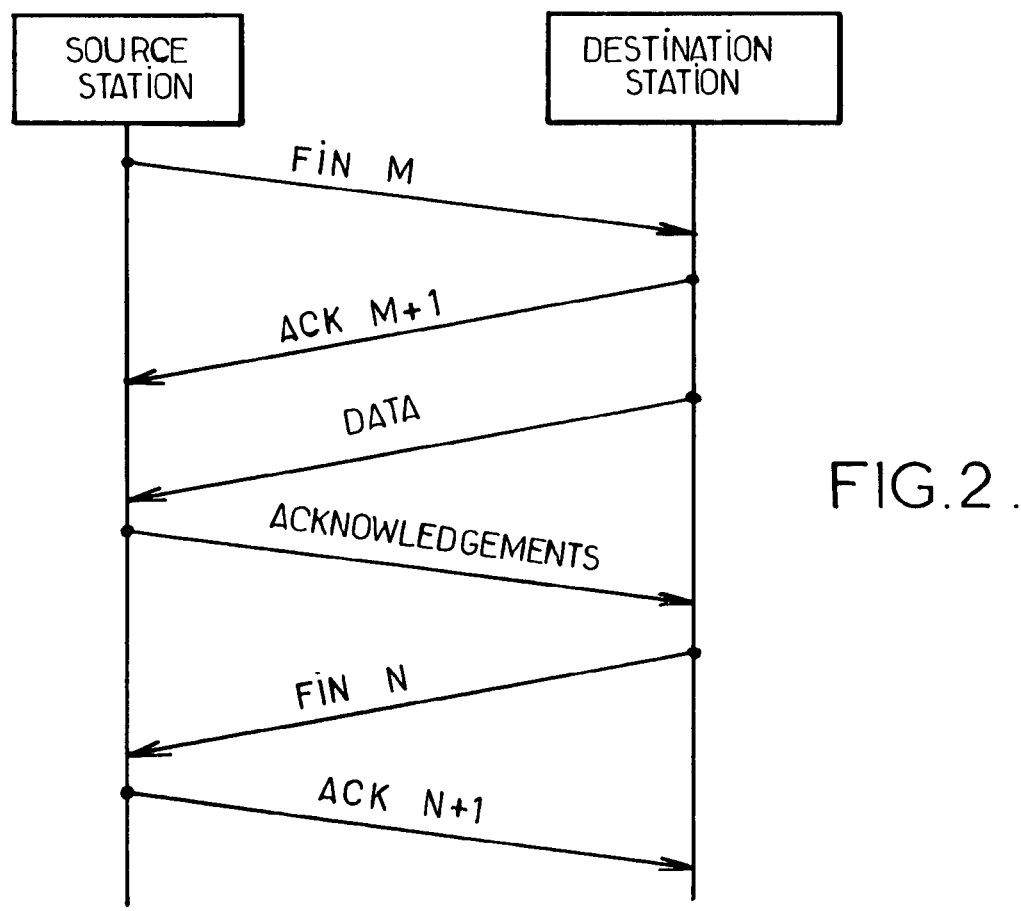

Shutdown of a TCP connection between two stations is effected by an exchange of messages in the manner illustrated in FIG. 2 between the source and destination ports, the port addresses and numbers being identical to those used for activation purposes. The first message (FIN M) is a request to shut down the TCP connection instigated by the source station, which then performs an active shutdown. The shutdown of the connection in the source→destination direction is acknowledged by the second message (ACK M+1). The destination station does not instigate shutdown in the destination→source direction until it has no more data to transmit (passive shutdown). It also waits until it has received acknowledgement of the last data it transmitted. It then uses the same procedure as the source station to transmit the third message (FIN N) which does not contain any data, acknowledged by the source station via the last message (ACK N+1). A priori, this final message is only transmitted in response to the preceding FIN message.

MPLS

The primary objective of the MPLS group (<<MultiProtocol Label Switching>>) of the IETF is to define a technology which integrates the principles inherent in switching virtual circuits (analysis and translation of the packet headers) and routing the network layer. This groups standardises a set of protocols for distributing and maintaining labels in a point to point or broadcasting environment, integrating the QoS and constrained routing concept. It also defines the procedures for adaptation to the existing 2 layers Frame Relay, ATM, . . .

In a datagram network such as an IP network, when a packet passes from one router to another, these decide what the local routing will be and do so independently of the decision taken by their neighbour. Each router runs the layer 3 routing algorithm, analyses the header of the packets received and, depending on the results produced by these two operations, selects the next hop for routing the packet.

The choice for the next hop can therefore be regarded as the combination of two functions. The first splits the set of packets up into forwarding equivalence classes (FEC). The second associates with each FEC the corresponding next hop. As a result, packets belonging to different streams but the same FEC are indistinguishable. All the packets of a same FEC arriving from a same node then follow the same route. Typically, a conventional IP forwarding mechanism considers two packets as belonging to the same FEC if the routing table of the router being crossed contains an address prefix included in the destination address of each of the two packets.

In the case of MPLS, a packet is assigned to a FEC once and for all when the packet enters the network: at the label edge router (LER). The FEC to which the packet is assigned is identified by a label of a reduced, fixed size. This label is integrated in the packet before it is transmitted to the first stage. In the subsequent nodes or LSR (<<(Label Switch Router>>), analysis of the network layer header is replaced by a mechanism of addressing a switching and translation table, specifying the next hop and a new label with the aid of the input label used as an index into this table. The packet is then re-transmitted on to the next hop with the new label.

Conventional routing protocols (OSPF, BGP, . . . ) provide the information needed to allocate packets to a FEC and to distribute the labels between the nodes forming part of the MPLS network. Generally speaking, the labels are distributed from down up on the path taken by the packets of the corresponding FEC, thereby constructing label switched paths or LSP. A label distribution protocol, referred to as LDP, has been defined to enable the routes to be set up point to point.

One characteristic of MPLS is that one or more IP streams may be assigned to a same FEC and hence to a same LSP. Choosing the label granularity enables a balance to be struck between a same label shared between several destinations and the need to partition certain flows on the basis of finer parameters whilst conserving switching resources:

output router: all the packets whose destination passes via the same output router are transported by a same LSP terminating at this router. The information specifying the output router is supplied by the routing protocols via their topology update message and can therefore also be broadcast by the label distribution protocol. This is the granularity;

IP prefix: a prefix is a portion of IP address, generally a subset of the most significant bits. A FEC specified by an IP prefix defines a LSP across which all the packets whose destination IP address contains the prefix will pass;

application stream: conversely, a FEC may be defined by a much more detailed set of parameters, which may go as far as specifying a pair of source and destination IP addresses, a TCP or UDP port number associated with each of these addresses and optionally the type of service (TOS) transported. This type of granularity is tantamount to establishing an end-to-end connection between two applications. This degree of fineness can only be operated in small networks (campus or intranet). For a large open network, operating such size distribution with any degree of quality of service would only be conceivable for a certain number of IP streams. For the other streams, a prefix granularity would be conceivable.

The ASIA protocol

The general format of the RM cell used in the ASIA protocol (see above-mentioned article by J. Boyer et al.) is that given in Table I, where the first column lists the field names of the cell in accordance with the terminology used in ITU-T Recommendation I.371, the second and third columns give the positions (octets and bits) of these fields in the 53-octet ATM cell and the non-empty boxes of the fourth column indicate fields to which a specific code other than the generic code of ITU-T Recommendation I.371 is applied.

TABLE I

| FIELD | OCTET(s) | BIT(s) | CODE |
|---|---|---|---|
| ATM Header | 1–5 | all | |
| Protocol ID | 6 | all | ASIA |
| Message type: Direction | 7 | 8 | |
| Message type: Reset | 7 | 7 | x |
| Message type: Congestion Indication | 7 | 6 | |
| Message type: Activation | 7 | 5 | x |
| Message type: Request/Acknowledge | 7 | 4 | |
| Message type: Elastic/Rigid | 7 | 3 | |
| Message type: Renegotiation | 7 | 2 | x |
| Message type: Deactivation | 7 | 1 | x |
| CLP = 0 + 1 ICR | 8–9 | all | x |
| Reserved | 10–13 | all | |
| Block size | 14–17 | all | |
| Sequence number | 18–21 | all | |
| Reserved | 26–51 | all | |
| Reserved | 52 | 3–8 | |
| CRC-10 | 52 | 1–2 | |
| | 53 | all | |

The meaning of the bits of octet 7 in the RM cell, indicating the type of ASIA message, is as follows:

Direction (bit 8): indicates whether the RM cell relates to the forward direction (0) or the backward direction (1);

Reset (bit 7): indicates whether the RM cell is carrying a re-initialisation message corresponding to the TCP RESET message (1) or not (0);

Congestion indication (bit 6): indicates whether the request has succeeded (0) or failed (1);

Activation (bit 5): indicates when the RM cell activates the connection (1);

Request/Acknowledge (bit 4): request (O) or confirmation (1) message;

Elastic/Rigid (bit 3): indicates when the requested bit can be modified by the servers (O). In rigid mode, if the requested bit is not available, this bit switched to 1 means that the request has failed;

Renegotiation (bit 2): at 0 during connection and disconnection phases and at 1 during the transmission renegotiations;

Deactivation (bit 1): distinguishes the connection phase (0) from the disconnection phase (1).

Table II lists the ASIA protocol messages transmitted in the RM cells with the values corresponding to the bits of octet 7 and the cell rate (CR) specified in octets 8 and 9. The notation ICR (<<Initial Cell Rate>> denotes an initial rate and Λ a rate value which can be modified in elastic mode).

TABLE II

| ASIA MESSAGE | 8 | 7 | 6 | 5 | 4 | 3 | 2 | 1 | CR |
|---|---|---|---|---|---|---|---|---|---|
| Connection Activation Request | 0 | 0 | 0 | 1 | 0 | 1 | 0 | 0 | ICR |
| Connection Reset Request | 0 | 1 | 0 | 0 | 0 | 1 | 0 | 0 | 0 |
| Connection Reset Acknowledge | 1 | 1 | 0 | 0 | 1 | 1 | 0 | 0 | 0 |
| Connection Deactivation Request | 0 | 0 | 0 | 0 | 0 | 1 | 0 | 1 | 0 |
| Connection Deactivation Acknowledge | 1 | 0 | 0 | 0 | 1 | 1 | 0 | 1 | 0 |
| Elastic Bandwidth Request | 0 | 0 | 0/1 | 0 | 0 | 0 | 1 | 0 | Λ |
| Elastic Bandwidth Acknowledge | 1 | 0 | 0/1 | 0 | 1 | 0 | 1 | 0 | Λ |
| Elastic Bandwidth Confirmation | 0 | 0 | 0/1 | 0 | 1 | 0 | 1 | 0 | Λ |
| Reduction to ICR Request | 0 | 0 | 0 | 0 | 0 | 1 | 1 | 0 | ICR |
| Reduction to ICR Acknowledge | 1 | 0 | 0 | 0 | 1 | 1 | 1 | 0 | ICR |

The Connection Activation Request message is treated as a RM cell of the ABT/IT type (<<ABT with Intermediate Transmission>>): the data follows immediately after the RM cell whilst complying with the ICR rate. In the event of failure to establish the connection, the RM cell and the data are discarded.

The other messages are treated as RM cells of the ABT/DT type (<<ABT with Delayed Transmission>>): an acknowledge message ( . . . Acknowledge) corresponds to each request message ( . . . Request). No modification is made to the parameters until the corresponding acknowledgement has been correctly received. The change in rate is further confirmed by an additional message.

TCP/ATM Coupling

Figure 3:
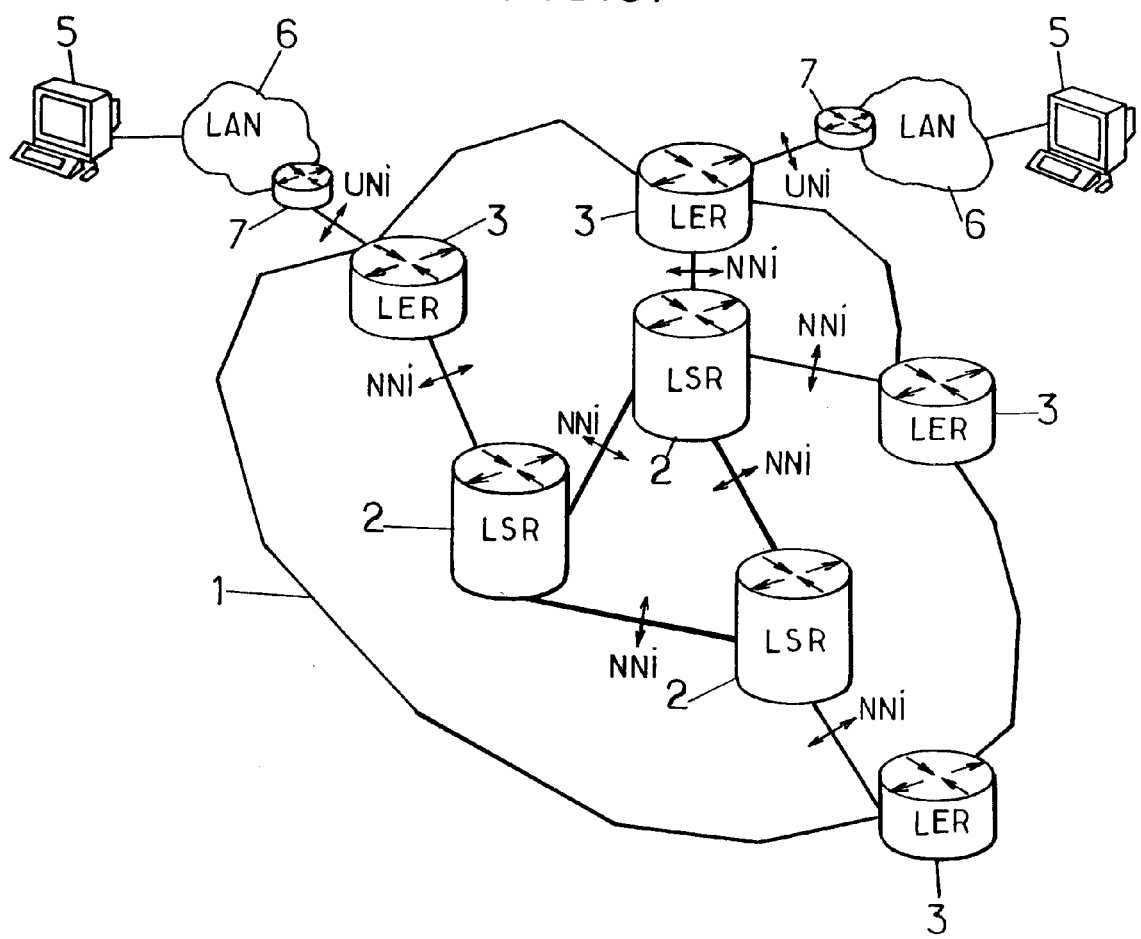
FIG. 3 is a diagram of an ATM network to which the present invention may be applied.

FIG. 3 illustrates an ATM network designed to be capable of carrying IP traffic complying with the ASIA protocol and integrating MPLS functions. The core of the ATM network 1 consists of interconnected switches 2, forming LSRs in the MPLS architecture, associated with access switches 3 (LER). The ATM interface between the switches 2, 3 is of the NNI type (=<Network—Network Interface>>). Users of the ATM network 1 are linked to the respective LERs across user-network interfaces (UNI).

In the example illustrated in FIG. 3, two IP user terminals 5 are connected to the network 1 by means of local area networks (LAN) 6 each having a private router 7 connected to a LER 3 across the ATM UNI interface.

Figure 4:
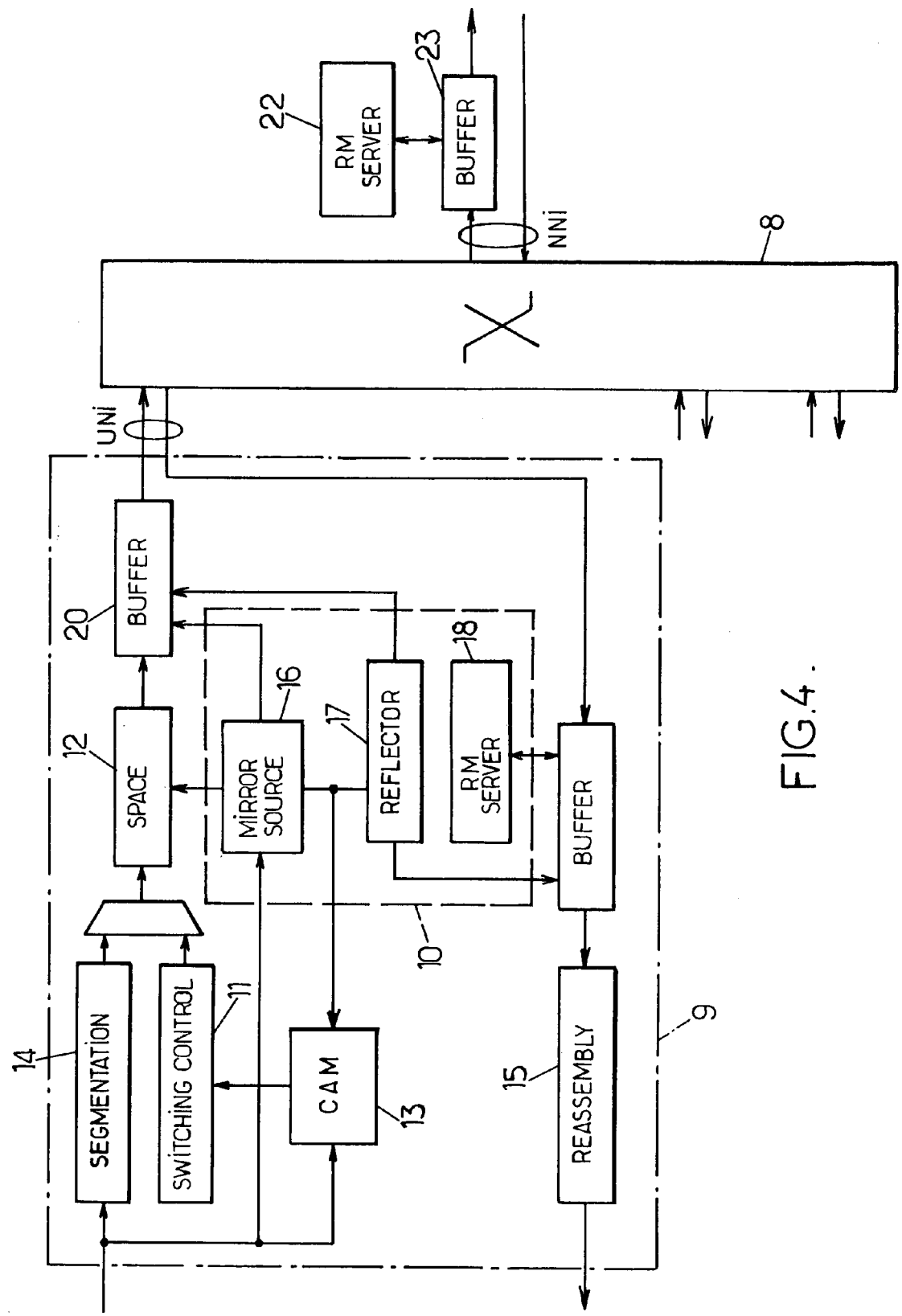
FIG. 4 is diagram of an access switch of the network illustrated in FIG. 3, equipped with means to implement the invention.

The method according to the invention relates to a way of providing TCP connections between such IP terminals connected to one another by means of the ATM network 1. The MPLS functions with which the ATM network 1 is provided are used for this purpose, in particular the label distribution protocol LDP, and the LER are equipped with modules programmed to run the following operations, as illustrated in FIG. 4:

detecting SYN, FIN and RESET segments respectively at the network input when a TCP connection is activated or deactivated respectively;

ATM resource management cells (RM) are associated with these specific segments;

regulating the TCP dynamics by spacing ATM cells;

coupling a TCP stream with an ATM VC established beforehand by MPLS, i.e. associating IP address/TCP port pairs for the source and destination with an identifier for the ATM VC (VPI/VCI, <<Virtual Path Identifier/Virtual Channel Identifier>>) performed as an option of the LDP protocol;

sending RM cells on the ATM VC associated with the TCP connection in order to reserve (in the case of a SYN segment) or release (FIN segment) the bandwidth for this VC.

The ATM routes in the network 1 are established beforehand by means of the label distribution protocol LDP. In the case of an IP transfer on ATM, the label associated with an IP address is the identifier for the ATM connection (VPI/VCI) which supports the flows whose destination is specified by the IP address. Several ATM VCs may be associated with a same IP address (this is the case with <<VP merging>> in particular, as provided in the MPLS architecture). The <<application stream>> granularity is used to determine the FECs in this case. Since it would not be conceivable a priori to assign a FEC to each known IP application stream, the LDP protocol is used to establish a set of labels, corresponding to a set of VCs, between each pair of access points to the output routers 3 of the network (LER). Once the initialisation phase of the network has been completed (OSPF and LDP initialisation), a set of sleeping VCs is available for each pair of LER access points of the ATM network.

Only the switching resources are established along the ATM virtual circuits. The transmission rate resource is not allocated until the ATM connection is established (referred to here as wakeup).

The ATM routes are bidirectional. In the example described here, they are used in mono-directional mode with regard to the IP stream transported except in the case of <<Acknowledge>> type messages of the ASIA protocol. Wake-up is effected by lightweight ATM signalling messages, carried by the RM cells, synchronised with the procedure of establishing a TCP connection (SYN segment).

The ASIA protocol reproduces the behaviour of the TCP protocol for the connection and disconnection phases. The ASIA messages precede the TCP messages without introducing any additional forward-backward relaying in the network during the phase when the connection is being established.

Turning to FIG. 4, each UNI interface of the ATM switch ATM 8 of a LER 3 is equipped with a device 9 comprising an ASIA protocol management module 10, a switching control module 11 designed to insert the appropriate VPI/VCI in the ATM cells carrying the TCP flows from users connected via this interface, and a spacer 12 to space the ATM cells transmitted by each source (TCP port) on a given VC. The switching control module 11 operates using an associative memory 13 which enables the VPI/VCI to be retrieved from the <@IPd, Pd, @IPs, Ps> quartet extracted from the TCP segments received. In the example provided as an illustration here, the device 9 also has segmentation and reassembly modules 14, 15 to encapsulate and de-encapsulate respectively the TCP segments into and from the ATM cells transmitted on the network (ML adaptation 5). If the adaptation is performed elsewhere, for example in the private routers 7, the segmentation and reassembly functions will not be necessary since a translation of the VPI/VCI will suffice for each communication direction.

Functionally, the ASIA management module 10 consists of a <<mirror source>> 16 for the up direction (at the input of the ATM switch ATM 8), and a <<reflector>> 17 associated with a <<RM server>> 18 for the down direction (at the output of the ATM switch ATM 8). Reference 20 denotes a buffer memory for transmitting cells to the switch 8, where the cells are written, spaced relative to the active connections, along with the RM cells transmitted by the mirror source 16 and the reflector 17 of the module 10. Reference 21 denotes a buffer memory receiving cells from the switch 8, to which the reflector 17 and the RM server 18 of the module 10 have access so as to be able to manage the ASIA protocol.

In addition, the NNI interface of the switch 8 is equipped with a RM server 22 controlling a buffer memory 23 for transmitting cells to the next node of the network 1. Similar RM servers are provided in the outgoing direction to the NNI interfaces of each of the LSR 2 so as to be able to supervise traffic on the links in the network core.

In terms of implementation, the device 9 positioned at each UNI interface may be a cell processor of the type sold by circuit manufacturers, for example <<ATMizerll+>> old by LSI Logic, <<PowerQUIC II>> sold by Motorola, or <<MXT 4400>> sold by Maker Inc. Each of these processors is provided with mechanisms enabling them to space ATM cells, process RM cells and, optionally, perform segmentation and reassembly operations. Apart from the usual context and cell storage memories, an associative memory (CAM) 13 is provided which enables the VPI/VCI to be retrieved from the <@IPd, Pd, @IPs, Ps> quartet. This memory 13 also enables coupling when the quartet carried by the SYN+ACK is received from the destination station. Its contents are regularly updated by the label distribution protocol LDP.

In order to manage the memory 13, the processor may operate a mechanism of the <<forwarding>> type based on a <<longest match prefix>> algorithm enabling the VPI/VCI to be picked up from the <@IPd, @IPs, Pd, Ps> quartet. An example of such a mechanism applied to an associative memory of the TRIE type is described in European patent application N° 0 989 502. In one particular embodiment, the awoken VC are assigned to the prefixes held in the memory 13 having a length equal to the number of bits (96) in the <@IPd, @IPs, Pd, Ps> quartet, whilst the sleeping VC sets are assigned to the prefixes held in the memory 13 having a length of less than 96 bits but at least equal to 80 bits (80 bits correspond to the triplet <@IPd, @IPs, Pd>, this value being appropriate if the transfer protocol is TCP since the device 9 cannot generally know a priori which TCP port number will be used by a given source), a match with a prefix of less than 80 bits instigating a connection without QoS. In this case, the fact of operating on the basis of a match of at least 80 bits with the quartet read from the header of an IP packet means that this packet relates to a connection with quality of service.

Furthermore, the processor of the interface device 9 integrates MPLS functions in order to be able to co-operate with the entities of the network 1. In particular, this enables the LDP protocol to be applied when configuring the network to proceed with reserving the ATM VCs and thereby supplying the sleeping VC sets that will be woken up to support the TCP connections.

Wake-up of an ATM VC When Activating a TCP Connection

Figure 5:
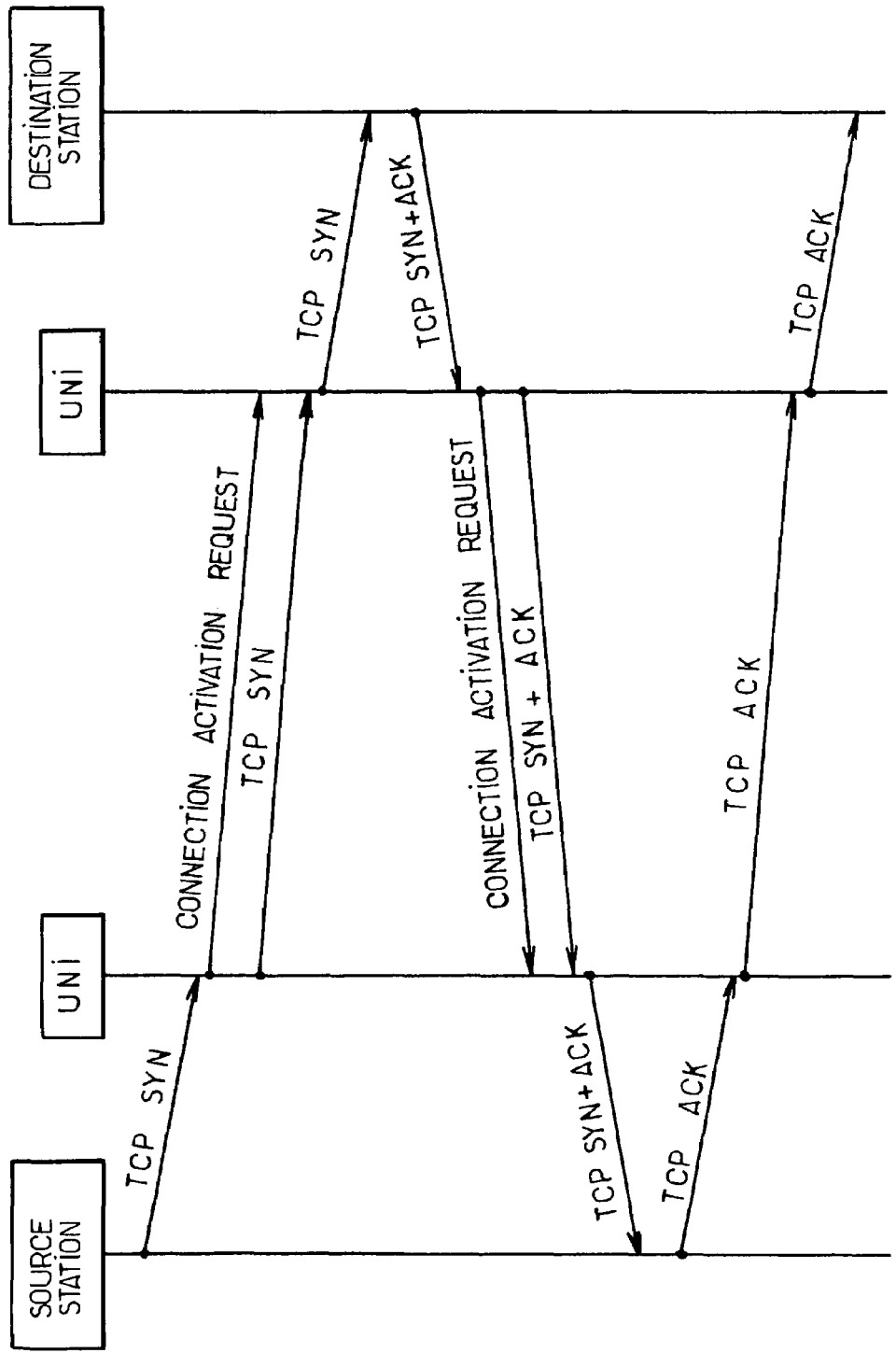
FIGS. 5 to 7 are diagrams illustrating respectively the initiation, termination and interruption of a TCP connection between two stations, operated as proposed by the invention.

The wake-up procedure at ATM level is illustrated in FIG. 5. It is based on processing mono-cell messages carried by the RM cells. These messages are processed on the fly, i.e. in an ATM cell time, by the devices 8 equipping the UNI interfaces and by the RM servers 22 equipping the NNI interfaces. Similarly to TCP, the ASIA protocol establishes two independent ATM half-connections.

When the mirror source 16 located at the UNI interface to which the source station is connected detects that a SYN segment with a header containing a <@IPd, @IPs, Pd, Ps> quartet has been transmitted, it looks in the memory 13 to ascertain whether the SYN segment is requesting establishment of a connection with quality of service and, if such is the case, to identify the list of VCs likely to support this connection.

In the example described above, this detection process may be based on the number of matching bits of the prefixes. If this number is less than 80, the ASIA protocol is not used. If a <@IPd, @IPs, Pd> triplet in the memory 13 is recognised in the SYN segment (match over at least 80 bits), the connection will be a quality of service connection, which means that the ASIA protocol will be used: the mirror source 16 uses the destination address @IPd to search for the set of VCs leading to this address. This search may simply be based on the fact that reading the memory 13 on the basis of the <@IPd, @IPs, Pd, Ps> quartet produces a head of list of ATM connection identifiers (VPI/VCI) whose destination is the output point of the ATM network from which the address @IPd can be accessed. The mirror source 16 then searches this set of VCs for a free ATM connection. Once chosen, the ATM connection is withdrawn from the list of sleeping connections enabling @IPd to be accessed and is added to the list of connections woken up and associated with @IPd. This operation may consist in updating the memory 13 and assigning the selected VPI/VCI to the 96-bit prefix corresponding to the <@IPd, @IPs, Pd, Ps> quartet. This input will not be validated until the connection has been woken up end-to-end and it will then be used to relay all the datagrams of the TCP connection.

The mirror source 16 initialises a context for this connection: controller status, current rate, number of cells in the buffer, <@IPs, Ps, @IPd, Pd> quartet. The corresponding parameters are applied to the cell spacer 12. It also initiates a timer set so as to be equal to the time needed by TCP to activate a connection, i.e. 75 s. A multiple timing device of the type described in EP-A-0 504 082 may be used to manage all the timing operations, for example.

Once the VPI/VCI has been chosen, a RM cell carrying the <<Connection Activation Request>> message is sent on this VC via the mirror source 16 in order to wake up the connection. The TCP SYN segment will then follow, encapsulated in ATM cells transmitted on the same connection.

The RM servers encountered in succession (22 on the NNI interfaces and finally 18 on the destination UNI interface) check, for each network link, whether the ICR rate requested in octets 8 and 9 of the RM cell is available for the new connection. If such is the case, the RM cell is despatched to the next node.

If not, either due to the fact that no VC is available in the mirror source 16 or the requested ICR rate is not available in a node of the network 1, the RM cell and the SYN segment are discarded, as in the ABT/IT protocol. The mirror source 16 will release the reserved resources (ICR and VC) if it does not see the ACK segment corresponding to the SYN segment pass by before the end of the total timed period of 75 s, which allows TCP to make two fresh attempts to connect.

If the RM cell reaches the reflector 17 in the LER servicing the destination station, the latter will pick up the VPI/VCI on which this RM cell arrived and issue a command for it to be deleted from the buffer 21. If it receives the SYN segment which follows on the same VC, it will pick up the <@IPs, Ps, @IPd, Pd> quartet and store it in association with the VPI/VCI. The SYN segment is then returned to the destination.

The pairing of the <@IPd, Pd, @IPs, Ps> quartet with the second ATM half-connection does not take place until the TCP SYN+ACK segment containing the <@IPs, Ps, @IPd, Pd> quartet is received by the mirror source 16 to which the destination station is connected.

The RESET segment, which breaks off the two half-directions of the TCP connection by means of a single message that will be sent either by the source or by the destination, requires the two ATM connections to be coupled in the mirror sources and reflectors in order to release all the resources. This is the last operation performed at the destination UNI for establishing a connection: once the SYN+ACK segment is detected, the mirror source 16 proceeds as explained above and also stores an association between the VPI/VCI of the VCs assigned to the two communication directions on the basis of the <@IPs, Ps, @IPd, Pd> quartet extracted from the SYN+ACK segment and the corresponding quartet which was picked up by the reflector 17 from the SYN segment received in the other direction.

The reflector 17 of the device 9 to which the source station is connected extracts the identity of the ATM VC on which the second <<Connection Activation Request>> RM cell is received as well as the <@IPs, Ps, @IPd, Pd> quartet carried by the TCP SYN+ACK segment following on the same VC. The mirror source 16 of the same device 9 memorises the <@IPd, Pd, @IPs, Ps> quartet and then couples the two ATM half-connections.

The global bandwidth reserved for ASIA connections on each link used is divided into two parts: the elastic capacity and the wake-up capacity. The wake-up capacity is shared between the ICRs of all the awoken routes. It is used by the RM servers as a parameter for accepting or rejecting a wake-up request: on any given link, a route may be woken up if the sum of the ICRs (including that of the route currently being woken up) is less than or equal to the wake-up capacity. The RM servers may also run more sophisticated algorithms to process the transmission rate requests.

Establishing the connection in the manner described above avoids having to transport the full identifier of the TCP connection <@IPd, Pd, @IPs, Ps>, i.e. 12 octets with an IPv4 addressing and up to 40 octets with an IPv6 addressing, in the RM wake-up cells.

A SYN or SYN+ACK segment triggers transmission of a RM cell carrying the <<Connection Activation Request>> message. The mirror sources memorise the VP/VC and the <@IPd, Pd, @IPs, Ps> quartet when the first SYN or SYN+ACK segment is received. If the connection fails to wake up, the RM activation cell and the TCP segment are discarded. This means that the destination TCP stack will never receive this segment and will therefore never acknowledge it. Elapse of the time allotted for the transmitting TCP stack will prompt a first re-transmission of the SYN or SYN+ACK segment. If the segment has been discarded by the mirror source 16 (no free VC), the initial procedure is resumed. Otherwise, the mirror source does nothing because this connection has already been woken up at its level. Each node of the network which has accepted this connection and reserved an ICR (RM server) will do nothing either. The procedure is resumed at the first node which refused the call. This gives TCP the possibility of being able to complete the call establishment but without having to resume from zero and lose the benefit of the earlier attempts. The second re-transmission is processed in exactly the same way. Not until after the end of the timed period of 75 s, initiated with the first SYN or SYN+ACK segment, will the mirror source 16 release the resources with the aid of the <<Connection Deactivation Request>> message which will be acknowledged by a <<Connection Deactivation Acknowledge>> message, as with a normal connection termination.

Renegotiating Transmission Rate During the TCP Connection

At regular intervals (for example about 4 times the forward-backward relay time within the network), a RM cell is sent by the mirror source 16 to adjust the rate reserved for the activity of the source.

For each connection, the mirror source continuously measures how full the spacing buffer 20 is. If the contents of the buffer exceed a given upper threshold, the mirror source 16 sends an <<Elastic Bandwidth Request>> message to request bandwidth. Conversely, if the contents of the buffer are below a lower threshold, the mirror source will release bandwidth by means of the <<Reduction to ICR Request>> message. The multiple timer device described in EP-A-0 504 082 may also be used.

Putting an ATM VC to Sleep When a TCP Connection Has Been Shut Down

Figure 6:
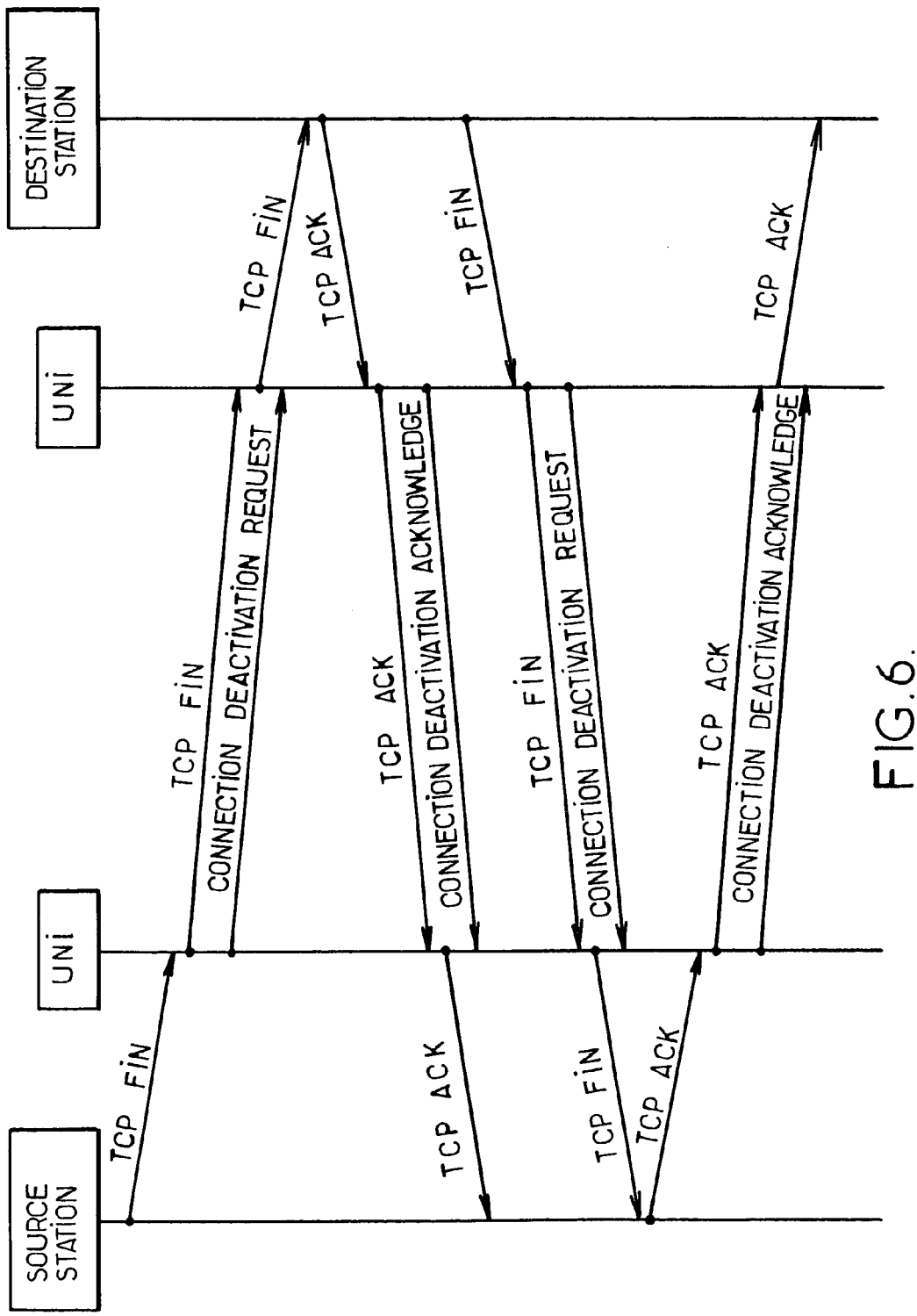

The ATM VC shut down (FIG. 6) is performed independently on each direction of the TCP connection and is initialised when a FIN TCP message is detected.

When the mirror source 16 detects that a FIN segment has been transmitted by <@IPs, Ps> destined for <@IPd, Pd>, it transmits, after this FIN segment, a <<Connection Deactivation Request>> RM cell on the forward direction.

On the backward direction, this request prompts the release of any transmission rate which might have been reserved as well as the ICR rate causing the nodes (including the mirror source) to switch to a standby state in anticipation of the corresponding deactivation acknowledgement coming from the backward direction. Once the <<Connection Deactivation Acknowledge>> message has been received, the mirror source returns the ATM VC of the TCP connection to the set of free VCs with an @IPd address.

In order to deactivate the backward direction, a symmetrical procedure is launched by the destination mirror source once the FIN segment transmitted by <@IPd, Pd> addressed to <@IPs, Ps> is detected.

In the event of non-simultaneous shutdown at TCP level (which therefore leads to a non-simultaneous deactivation at ATM level), the mirror source, which no longer has a specific ATM VC for the TCP connection in question, nevertheless receives acknowledgement segments (ACK) from <@IPs, Ps>, addressed to <@IPd, Pd>. Once the ATM VC is released, the mirror source changes the pairing of the <@IPd, Pd, @IPs, Ps> quartet and allocates it a default ATM routing VC addressed to the destination mirror source. Every TCP connection for which the ATM half-connection addressed to a given output point has been released will therefore have its ACK segments transmitted on the default ATM VC addressed to this given output point. When the network is initialised, the ASIA protocol reserves a VC from the set of VCs configured by LDP as a default ATM VC towards the different output points.

Abortive Shutdown and Establishment Rejection

These two procedures are based on transmission of a TCP message of the RESET type prompting an immediate shutdown of the TCP connection.

In the case of an abortive shutdown, one of the two stations takes the initiative of forcing the TCP connection to shut down when a data exchange is in progress by sending a RESET segment.

Establishment rejection occurs if one station is trying to establish a connection with a non-existent remote port. The destination station then responds with a RESET segment which breaks off the attempt to connect.

Figure 7:
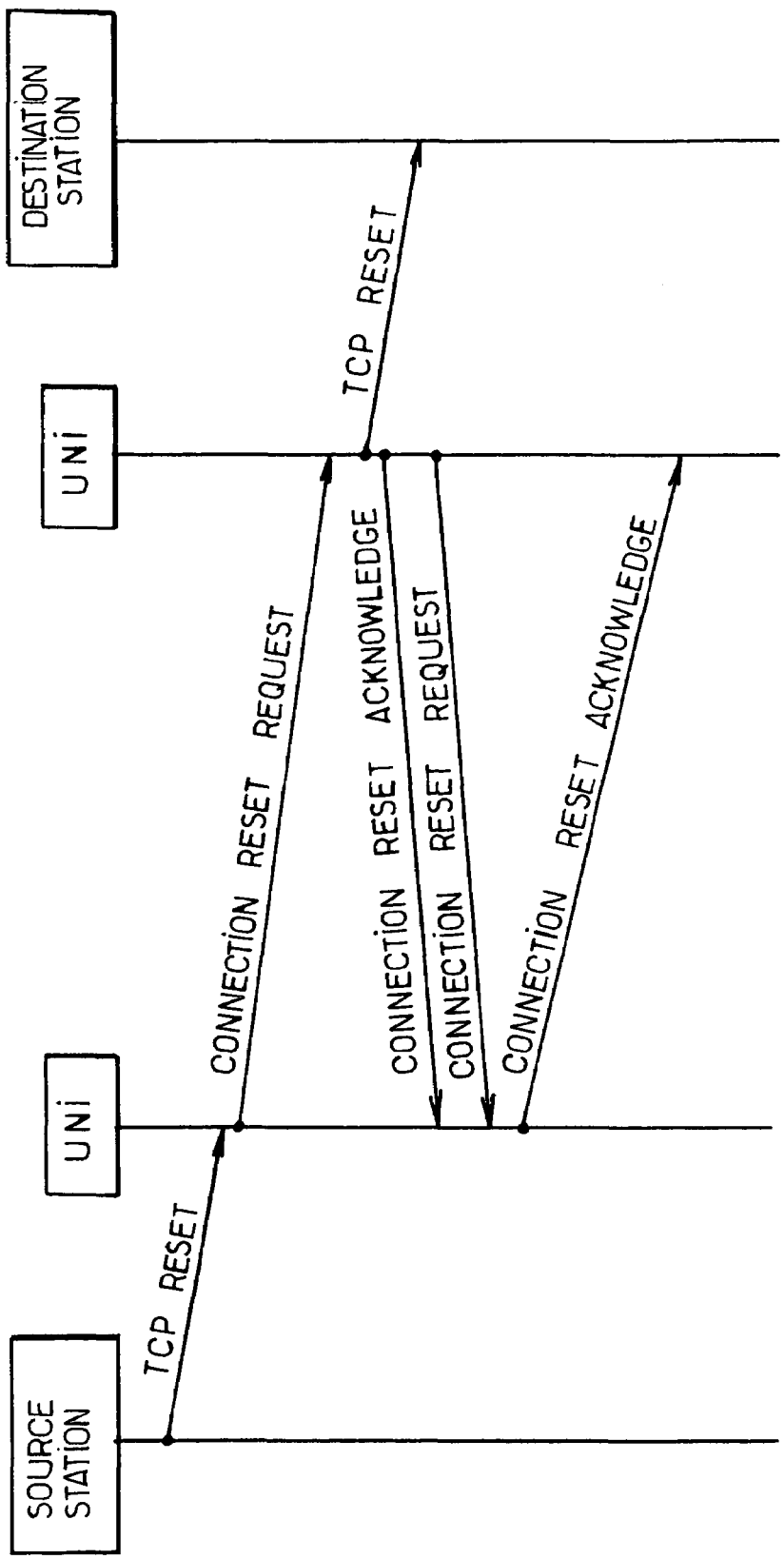

Such a break-off in the TCP connection (FIG. 7) can be translated at the ATM level with transmission of an ASIA <<Connection Reset Request>> message requesting the two connection directions to be shut down by the mirror source detecting transmission of a TCP RESET segment. This request is then transmitted following the RESET segment, irrespective of the status of the station transmitting the RESET segment. When the module 10 at the other end receives the <<Connection Reset Request>> message, it responds with a <<Connection Reset Acknowledge>> message and in turn transmits a <<Connection Reset Request>> primitive on the other ATM half-connection (obtained due to the coupling of the two half-connections). When a module 10 receives the <<Connection Reset Acknowledge>> message, it releases the ATM VC and deletes the coupling. After a RESET segment, no other TCP segment will be exchanged on this connection, which means that there is no need to modify the coupling to use a default ATM VC as is the case with shutdown using the FIN segment.

Some Possible Variants

When establishing a TCP connection, the TCP SYN request could be stored in a file associated with the ATM connection whilst waiting for the wake-up procedure of the ATM connection to end. However, the method described above has the advantage of minimising the time needed to establish the connection.

Connection establishment could be triggered solely by the TCP SYN segment. This being the case, the <<Connection Activation Request>> message activates a two-way connection for the two TCP half-connections simultaneously. It will then be necessary to provide a mechanism to account for the number of nodes crossed in order to be able to opt for one of two potential simultaneous activation requests progressing in the reverse direction on the same VP/VC. The VP/VC could also be allocated depending on the direction in which the connection is activated.

Shutdown of the connection may also take places in two stages. In this case, the connection will firstly switch to the sleeping state (the VC is still active but the reserved rate is ICR and cannot be increased any more) once the FIN segment has been received. The connection will be broken (VC and ICR released) when the mirror source which received the first FIN segment receives acknowledgement from the other mirror source. Although this solution requires the FIN messages to be memorised, it eliminates the need for the default VC to carry the acknowledgements.

Coupling maybe effected by transporting the <@IPs, Ps, @IPd, Pd> quartet in the RM activation cell, which will avoid the reflector having to decode the TCP SYN and SYN+ACK segments.

The method according to the invention may be applied to protocols other than TCP, particularly to the connected mode protocols used on top of UDP (for example RTP).

If the method is applied to both TCP connections and connections using UDP in an intermediate protocol layer, the ATM VCs can be assigned on the basis of a quintet, in which case a connected mode protocol identifier will be added to the <@IPs, Ps, @IPd, Pd> quartet.

Generally speaking, the invention offers a solution for coupling ATM with one or more upper layer connected mode protocols, carried by at least one intermediate non-connected mode layer.

What is claimed is:

1. A method of transmitting, over an ATM network, data flows generated in accordance with a connected mode transport protocol and formatted in packets in accordance with a non-connected mode network protocol, each packet containing a source address and a destination address, the method comprising the steps of:

assigning, in advance, a set of virtual circuits of the ATM network to each pair of access points of the ATM network without allocating transmission rate resources to said virtual circuits;

when a first access point of the ATM network receives a request, formulated in accordance with said connected mode protocol, to establish a connection between a source address and a destination address accessible via a second access point of the ATM network, selecting an available virtual circuit from the set assigned to the pair comprising said first and second access points of the ATM network and transmitting on the selected virtual circuit an ATM resource management cell containing a message requesting activation of the selected virtual circuit;

when said ATM resource management cell is received by a node of the ATM network located on the selected virtual circuit, assigning a transmission rate resource, if available, to the selected virtual circuit.

2. A method as claimed in claim 1, wherein the activation request message contains an indication of a transmission rate resource required for the connection.

3. A method as claimed in claim 2, wherein the transmission rate resource indicated in the activation request message represents a reference rate on the connection, and wherein ATM resource management cells containing flow adjustment messages relating to the reference rate are transmitted on the virtual circuit selected by the first access point of the ATM network and acknowledged on the virtual circuit selected by the second access point of the ATM network.

4. A method as claimed in claim 1, wherein transmission of the ATM resource management cell containing the activation request message is immediately followed by transmission on the selected virtual circuit of at least one ATM cell carrying said connection establishment request.

5. A method as claimed in claim 4, wherein each ATM cell following the activation request message on the selected virtual circuit and carrying said connection establishment request is discarded by a node of the ATM network located on the selected virtual circuit if the transmission rate resource to be allocated to the selected virtual circuit is not available.

6. A method as claimed in claim 5, comprising the steps of:

starting a timer at the first access point of the ATM network when transmitting the ATM resource management cell containing the activation request message;

if no acknowledgement of said connection establishment request carried by at least one ATM cell following the activation request message on the selected virtual circuit is received from the second access point of the ATM network by the first access point of the ATM network before the timer expires, transmitting on the selected virtual circuit an ATM resource management cell containing a request to deactivate the selected virtual circuit.

7. A method as claimed in claim 6, wherein said timer has a duration corresponding to that of a retransmission time stipulated by said connected mode transport protocol.

8. A method as claimed in claim 6, comprising the steps of:

if a repetition of the connection establishment request is received by the first access point from the source address before receiving an acknowledgement of said connection establishment request from the second access point of the ATM network, re-transmitting on the selected virtual circuit at least one ATM cell carrying said connection establishment request;

when the re-transmitted ATM cell carrying said connection establishment request is received by a node of the ATM network which has discarded the ATM cell following the activation request message on the selected virtual circuit and carrying said connection establishment request, allocating a transmission rate resource, if available, to the selected virtual circuit.

9. A method as claimed in claim 1, wherein transmission rate resources are allocated to two separate ATM virtual circuits for two opposite directions of communication between the first and second access points.

10. An interface device for a first access point located at a user-network interface of an ATM network, for transmitting over said ATM network data flows generated in accordance with a connected mode transport protocol and formatted in packets in accordance with a non-connected mode network protocol, each packet containing a source address and a destination address, the device comprising:

means for assigning, in advance, a set of virtual circuits of the ATM network to at least one pair consisting of said first access point of the ATM network and a second access point of the ATM network, without allocating transmission rate resources to said virtual circuits;

means for selecting an available virtual circuit from the set assigned to the pair comprising said first and second access points of the ATM network in response to receipt of a request, formulated in accordance with said connected mode protocol, to establish a connection between a source address and a destination address accessible via the second access point;

means for transmitting on the selected virtual circuit an ATM resource management cell containing a message requesting activation of the selected virtual circuit and for allocating transmission rate resources to the selected virtual circuit.

11. An interface device as claimed in claim 10, wherein the activation request message indicates a transmission rate resource representing a reference rate on the connection and the transmission means are arranged to transmit on the selected virtual circuit ATM resource management cells containing flow adjustment messages relative to the reference rate.

12. An interface device as claimed in claim 10, wherein the transmission means are arranged to transmit on the selected virtual circuit, immediately after the ATM resource management cell containing the activation request message, at least one ATM cell carrying said connection establishment request.

13. An interface device as claimed in claim 12, further comprising:
- means for starting a timer when transmitting the ATM resource management cell containing the activation request message;
- means for transmitting on the selected virtual circuit an ATM resource management cell containing a message requesting deactivation of the selected virtual circuit if no acknowledgement of said connection establishment request carried by at least one ATM cell following the activation request message is received on the selected virtual circuit before the timer expires.

14. An interface device as claimed in claim 13, wherein said timer has a duration corresponding to that of a retransmission time stipulated by said connected mode transport protocol.

15. An interface device as claimed in claim 13, further comprising:
- means for retransmitting on the selected virtual circuit at least one ATM cell carrying said connection establishment request if a repetition of the connection establishment request is received from the source address before receiving an acknowledgement of said connection establishment request.

16. An interface device as claimed in claim 10, comprising means for allocating transmission rate resources to two separate ATM virtual circuits for two opposite directions of communication between the first and second access points.

* * * * *